United States Patent Office.

EDWIN T. RICE, OF NEW YORK, N. Y.

Letters Patent No. 92,098, dated June 29, 1869.

IMPROVED PROCESS OF TREATING VEGETABLE FIBRES.

The Schedule referred to in these Letters Patent and making part of the same.

*To all whom it may concern:*

Be it known that I, EDWIN T. RICE, of the city and State of New York, have invented and made a certain Improvement in the Process of Treating Vegetable Fibres, for the purpose of softening them, by changing the character, or by removing foreign substances in contact with the fibres; and I do hereby declare the following to be a full, clear, and exact description of the said invention, and of the features that distinguish the same from previous processes.

Vegetable fibres, particularly such as flax and hemp, have heretofore been subjected, in the straw, the fibre, the yarn, or the fabric, in one or all these conditions, to fermentation produced by steeping in tepid water, for the purpose of dissolving and removing, in greater or less degree, the gums and other substances in and about such fibres.

For like purposes, vegetable fibres have been subjected to the action of steam and to the action of alkalies.

After the application of alkalies, acid solutions have been used, in the main, to neutralize the action of the alkalies upon the fibres.

Acid solutions have also been used, immediately before and after the application of chlorine, to facilitate the process of bleaching the fibres, and to neutralize the chlorine.

The processes named, for softening and removing the gums and other substances in contact with fibres, are well known, require much time, careful watching, and skill. They are also expensive and uncertain, and imperfect in result. They also tend to set a color in the fibres that impedes the process of bleaching.

In treating vegetable fibre, the same has been fermented, and an acid liquid has thus been produced. My invention does not relate alone to the use of acid.

I have discovered that weak acid solutions, and a temperature of more than 100° Fahrenheit, will, in a short time, so affect the gums and other substances in contact with vegetable fibres, that the gums will become soft and soluble in water, when they may easily be removed from the fibres, to the extent that may be desired.

Unrotted flax and hemp-straw, after this treatment, will readily yield the fibre from the stalk, under the ordinary mechanical modes of treatment.

Flax and hemp-fibres unrotted, or imperfectly rotted, and yarn and fabrics made from such fibres, may by this treatment be speedily and at slight expense made soft, pliable, and sightly.

I find that the straw, fibres, yarn, or fabric steeped in an acid solution, formed by mixing one part sulphuric acid with about three hundred or four hundred parts of water, heated to a temperature of about 150° Fahrenheit, from one to two hours, will ordinarily be sufficiently acted upon to produce the desired results.

The temperature of this solution may with safety, and sometimes with advantage, be carried to a higher temperature, but below the boiling-point.

The proportion of acid used may be varied, as the acid is stronger or weaker, and as the fibres may require more or less treatment. So the length of the steep may be varied, and sometimes the process may be repeated, in a fresh acid solution, with advantage.

Other acids than sulphuric acid may be used successfully, for producing the same result, but sulphuric acid is now the most economical for the purpose.

This process may be applied, obviously, by the ordinary steeping-vats used for steeping straw or fibre, or by the vats used for boiling yarn or fabrics.

I prefer, however, that the material, while under treatment, be kept in motion, or be placed in and out of the solution continuously, during the treatment, and for yarn and woven fabrics, I usually place elastic or other rollers over the vat, so that the fabric or yarn may be carried continuously between squeezing or wringing-rollers during the treatment.

The treatment proposed is practically found to be of great importance, from the greater economy of time, labor, and chemicals required, as compared with other processes, and because the fibre and fabrics that have undergone this treatment, are superior in quality, condition, appearance, and weight to those prepared in the usual manner.

What I claim, and desire to secure by Letters Patent, is—

The method herein specified of treating flax, hemp, and similar vegetable fibres, by an acid solution, at a temperature of more than 100° Fahrenheit, and less than the boiling-point, for the purposes and as set forth.

In witness whereof, I have hereunto set my signature, this 2d day of February, A. D. 1869.

EDWIN T. RICE.

Witnesses:
GEO. D. WALKER,
GEO. T. PINCKNEY.